Sept. 11, 1928.
W. E. TRUMPLER
1,684,162
TRANSMISSION
Filed Feb. 26, 1925
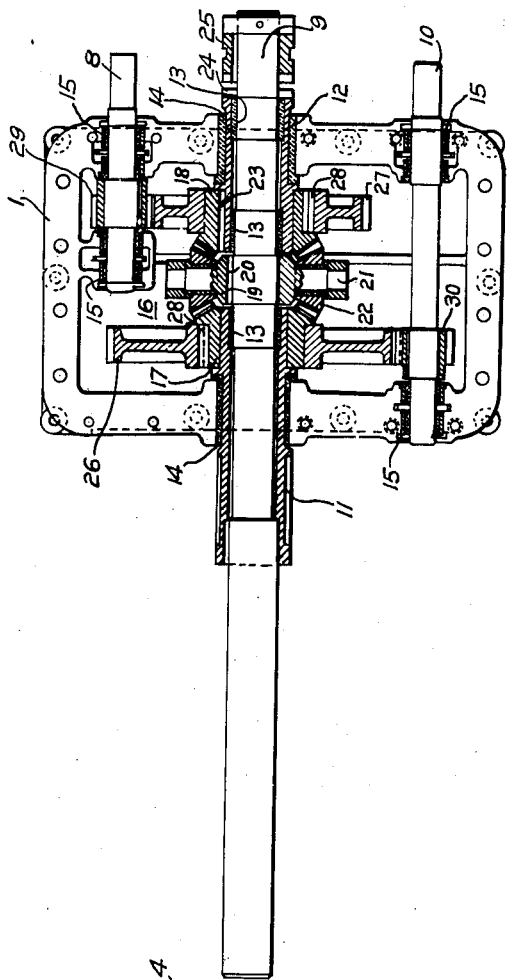
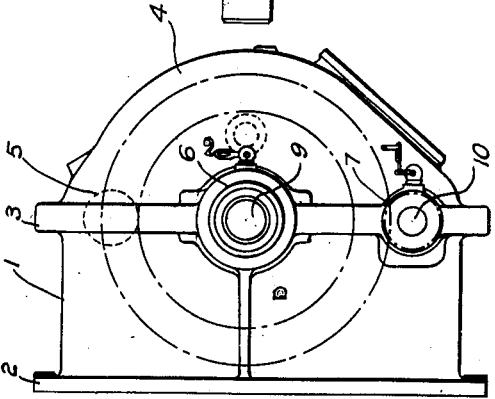
WITNESSES:
*A. J. Schiefelbein*
*W. B. Jaspert*
INVENTOR
*William E Trumpler.*
BY
*Wesley G. Carr*
ATTORNEY Patented Sept. 11, 1928.

1,684,162

UNITED STATES PATENT OFFICE.

WILLIAM E. TRUMPLER, OF WILKINSBURG, PENNSYLVANIA, ASSIGNOR TO WESTINGHOUSE ELECTRIC & MANUFACTURING COMPANY, A CORPORATION OF PENNSYLVANIA.

TRANSMISSION.

Application filed February 26, 1925. Serial No. 11,723.

My invention relates to transmissions, more particularly to gear transmissions serving to co-ordinate two or more driving or driven members for the purpose of obtaining proper torque and speed regulation.

It is among the objects of my invention to provide a gear transmission which shall be embodied in a single housing member to constitute a transmission unit and which shall be adapted to be coupled to the shafts of several rotating elements.

It is another object of my invention to provide a transmission system and housing therefor which shall be of durable and simple mechanical construction and which shall be compact for the purpose of utilizing as little floor space as possible.

It is another object of my invention to provide a transmission system of the above-designated character which shall be efficient for the transmission of motion and power through a system of gearing to various shaft members constituting a part thereof; which shall be journalled for rotation in the transmission housing, and which shall be readily changeable as regards the direction and speed of rotation and the transmission of power by external means.

Transmission gearing is usually designed for the particular use for which it is employed; but, although the disposition of the gear axes are thus changed for the purpose of adapting the gear mechanism to a specific use, the general nature and function of the co-ordinating parts are quite similar because of the inherent nature of this form of gearing.

My invention relates to a gear transmission in which the driving or driven shafts connecting the planetary system and its co-operating sun-gears are journalled in the gear casing with their axes in parallel alinement. With this arrangement, the transmission system as a whole is particularly adapted to be coupled with a plurality of motive devices or prime movers to provide a wide range of speed and power regulation for the drive shaft, which may be coupled to a machine tool, or the like, where a variable speed and power mechanism is desired.

In the accompanying drawing constituting a part hereof and in which like reference characters designate like parts:

Figure 1 is a view, partially in section and partially in elevation, of a transmission mechanism embodying the principles of my invention, the cover plate being removed, and Fig. 2 is a view in end elevation thereof.

Referring to the drawing, the mechanism therein illustrated comprises a housing 1 that is provided with flanges 2 and 3, respectively, constituting a base and an engaging portion for the cover or cap 4. The housing is provided with suitable longitudinally extending openings 5, 6 and 7, constituting journals for shafts 8, 9 and 10, respectively, which are disposed with their axes in parallel alinement. A pair of quills or sleeves 11 and 12 are journalled for rotation on the shaft 9 by means of a plurality of sleeve bearings 13. The sleeve members 11 and 12 are also journalled in the casing and cover 1 and 4, respectively, by means of flanged bearing sleeves 14. In like manner, the shafts 8 and 10 are journalled in the housing by means of suitably located bearings 15.

A differential mechanism comprising a planetary system 16 and a pair of sun gearwheels 17 and 18 are respectively mounted on the shaft 9 and quills 11 and 12. The planetary system comprises a spider 19, the hub of which is secured to the shaft 9 by means of a key 20, and a plurality of stub shafts 21 extending radially from the hub 19 and adapted to rotatably carry a plurality of bevel gear or pinion members 22, which are co-operatively engaged with the sun gearwheels 17 and 18 respectively. The sun gear-wheel 17 is secured to the sleeve 11, while the gear-wheel 18 is secured to the sleeve 12 by a key 23. The sleeve 12 is provided with a clutch face 24 that is adapted to engage a clutch sleeve 25 on the end of the shaft 9. A pair of spur gear-wheels 26 and 27 are respectively mounted on the sun gear-wheels 17 and 18 and secured thereto by a plurality of keys 28. The shafts 8 and 10 are provided with pinion members 29 and 30 which co-operatively engage the gear-wheels 27 and 26, respectively.

The operation of my transmission is briefly as follows: With the shafts 8 and 10 connected to independent motive devices, such as electric motors, having means for regulating the speed and torque, the change in the speed torque characteristics of the respective shaft members will affect the speed-torque characteristics of the shaft 9 in the following manner. If the shafts 8 and 10 are rotated in the same or opposite directions, the speed of the shaft 9 will be one-half the difference of the speeds of the shafts 8 and 10 and will be in the direction of rotation taken by the shaft member running at the greater speed. This condition exists when the clutch 25 is disengaged from the sleeve 12. The shaft member 9 is driven through the planetary system 16 by means of the torque reactions on the teeth of the pinion members 22 effecting an impelling action with respect to the speed or resistance of the sun gear-wheels 17 and 18.

The range of speed variations, the torque and direction of rotation may be controlled in the following manner. One of the shaft members 8 or 10 may be operated at a constant speed of rotation, and the other shaft, by suitable control means, may be varied in its speed and direction of rotation to hold stationary the sun gear-wheel to which it is geared or to rotate the same in either direction, at any desired speed, for the purpose of effecting suitable speed or direction of rotation of the shaft 9.

One side of the differential device may be locked by engaging the clutch 25 with the sleeve 12, thus effecting a direct connection of the shafts 8 and 9.

It is evident from the foregoing description of my invention that a gear transmission made in accordance therewith provides an efficient means of regulating the speed and the direction of rotation of a plurality of driving and driven members and that the compactness, durability and nature of my device makes it applicable to a great many uses where differentiation of speeds is desirable.

Although I have described a specific embodiment of my invention, it will be obvious to those skilled in the art that various modifications may be made in the details of construction and in the proportion of the several cooperating parts without departing from the principles herein set forth.

I claim as my invention:

1. A transmission system comprising a casing, a plurality of shafts disposed in parallel alinement therein, a pair of sun gear-wheels loosely mounted on one of said shafts, a planetary gear-wheel secured to said shaft, spur gear-wheels mounted on said sun gear-wheels, spur pinions mounted on the others of said shafts in cooperative engagement with said spur gear-wheels, and a clutch member on said shaft for engaging one of said sun gear-wheels.

2. A transmission system comprising a casing, a plurality of shafts disposed in parallel alinement therein, a pair of sleeves mounted for rotation on one of said shafts, a pair of sun gear-wheels secured to said sleeves, a planetary gear-wheel system having a hub portion secured to said shaft, spur gear-wheels secured to said sun gear-wheels, spur pinions mounted on the others of said shafts in cooperative engagement with said spur gear-wheels, and a clutch member on said shaft for engaging one of said sleeves.

In testimony whereof, I have hereunto subscribed my name this 9th day of February, 1925.

WILLIAM E. TRUMPLER.